US009518486B2

(12) United States Patent
Koch et al.

(10) Patent No.: US 9,518,486 B2
(45) Date of Patent: Dec. 13, 2016

(54) METHOD FOR OPERATING AN INTERNAL COMBUSTION ENGINE, AND INTERNAL COMBUSTION ENGINE

(71) Applicant: Daimler AG, Stuttgart (DE)

(72) Inventors: Thomas Koch, Pfinztal-Berghausen (DE); Alexander Massner, Esslingen (DE); Frank Zimmermann, Stuttgart (DE); Herbert Zoeller, Stuttgart, DE (US)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/431,184

(22) PCT Filed: Aug. 16, 2013

(86) PCT No.: PCT/EP2013/002469
§ 371 (c)(1),
(2) Date: Mar. 25, 2015

(87) PCT Pub. No.: WO2014/048527
PCT Pub. Date: Apr. 3, 2014

(65) Prior Publication Data
US 2015/0275723 A1    Oct. 1, 2015

(30) Foreign Application Priority Data
Sep. 26, 2012  (DE) .................. 10 2012 018 953

(51) Int. Cl.
*F02D 13/02*    (2006.01)
*F01N 3/025*    (2006.01)
(Continued)

(52) U.S. Cl.
CPC .............. *F01N 3/025* (2013.01); *F01N 3/023* (2013.01); *F01N 3/2066* (2013.01); *F01N 9/002* (2013.01);
(Continued)

(58) Field of Classification Search
CPC .............. F02D 13/0215; F02D 13/0219; F02D 13/0242; F02D 13/0246; F02D 13/0249; F02D 41/405; F02D 13/0261; F02D 13/0265; F01N 2430/10
See application file for complete search history.

(56) References Cited

U.S. PATENT DOCUMENTS

| 7,246,595 B1 * | 7/2007 | Hoare ................... F01N 13/011 123/294 |
| 2003/0221421 A1 | 12/2003 | Gui et al. |

(Continued)

FOREIGN PATENT DOCUMENTS

| DE | 603 07 746 T2 | 8/2007 |
| DE | 10 2006 028 436 A1 | 12/2007 |

(Continued)

OTHER PUBLICATIONS

International Search Report dated Nov. 26, 2013 with English translation (seven (7) pages).

(Continued)

*Primary Examiner* — Jonathan Matthias
(74) *Attorney, Agent, or Firm* — Crowell & Moring LLP

(57) ABSTRACT

A method for operating an internal combustion engine involves using an injection valve to post-inject fuel into at least one cylinder of the internal combustion engine in order to help regenerate a particulate filter that is arranged in an exhaust system of the internal combustion engine, downstream of an oxidation catalyst. A closing moment of a discharge valve of a cylinder of the internal combustion engine is advanced when the temperature of the oxidation catalyst is in a first temperature range, and the post-injections are performed when the temperature of the oxidation catalyst is in a second temperature range, an upper limit of (Continued)

the first temperature range having a lower value that an upper limit of the second temperature range.

16 Claims, 6 Drawing Sheets

(51) Int. Cl.
*F01N 3/20* (2006.01)
*F02D 41/02* (2006.01)
*F01N 9/00* (2006.01)
*F01N 13/02* (2010.01)
*F02D 41/40* (2006.01)
*F01N 3/023* (2006.01)
*F01N 3/10* (2006.01)
*F02D 41/00* (2006.01)

(52) U.S. Cl.
CPC ........... *F01N 13/02* (2013.01); *F02D 13/0249* (2013.01); *F02D 13/0265* (2013.01); *F02D 41/024* (2013.01); *F02D 41/029* (2013.01); *F02D 41/405* (2013.01); *F02M 26/15* (2016.02); *F02M 26/43* (2016.02); *F01N 3/0231* (2013.01); *F01N 3/103* (2013.01); *F01N 2430/06* (2013.01); *F01N 2430/10* (2013.01); *F02D 2041/001* (2013.01); *F02D 2200/0802* (2013.01); *F02M 26/05* (2016.02); *F02M 26/06* (2016.02); *Y02T 10/18* (2013.01); *Y02T 10/24* (2013.01); *Y02T 10/26* (2013.01); *Y02T 10/44* (2013.01); *Y02T 10/47* (2013.01)

(56) References Cited

U.S. PATENT DOCUMENTS

2005/0241299 A1  11/2005  Brown
2009/0241519 A1  10/2009  Harndorf

FOREIGN PATENT DOCUMENTS

| | | |
|---|---|---|
| DE | 10 2010 014 824 A1 | 10/2011 |
| EP | 1 291 513 A2 | 3/2003 |
| EP | 1 384 879 A2 | 1/2004 |
| EP | 1 387 071 A1 | 2/2004 |
| EP | 1 980 725 A1 | 10/2008 |
| WO | WO 2005/003537 A1 | 1/2005 |

OTHER PUBLICATIONS

German Search Report dated Mar. 7, 2013, including partial English-language translation (ten (10) pages).

German-language Written Opinion (PCT/ISA/237) dated Nov. 26, 2013 (seven (7) pages).

Ruud Verbeek, "DAF Euro-4 heavy duty diesel engine with TNO EGR system and CRT particulates filter", Society of Automotive Engineers, Inc., (Nine (9) pages), Jan. 1, 2000.

* cited by examiner

METHOD FOR OPERATING AN INTERNAL COMBUSTION ENGINE, AND INTERNAL COMBUSTION ENGINE

BACKGROUND AND SUMMARY OF THE INVENTION

Exemplary embodiments of the invention relate to a method for operating an internal combustion engine, and an internal combustion engine which is designed for carrying out the method.

In automotive technology it is customary to filter soot particles from the exhaust gas, in particular from diesel engines, by means of a particle filter. The aim is to avoid an excessive accumulation of filtered particles in the particle filter. Accumulated soot particles in the particle filter may be continuously removed by oxidation, using $NO_2$ and $H_2O$ as oxidizing agents, at temperatures above approximately 250° C. This effect is also known as the continuous regeneration trap (CRT) effect, referring to a filter having continuous regeneration. Since the nitrogen oxides contained in the exhaust gas usually consist almost exclusively of NO, it is customary to increase the $NO_2$ portion by oxidizing this NO in an oxidation catalytic converter upstream from the particle filter. A corresponding system made up of a diesel oxidation catalytic converter (DOC) and a diesel particle filter (DPF) is known as a CRT System™.

The formation of $NO_2$ at the oxidation catalytic converter is improved by high proportions of noble metals, for example platinum and platinum group metals, which entails corresponding costs and is therefore disadvantageous. If the soot removal rate achieved by the CRT effect is not adequate, the particle filter is actively regenerated by thermally burning off the soot, specifically, by means of the oxygen contained in the exhaust gas. However, this thermal regeneration requires much higher temperatures of typically greater than 550° C. Such high temperatures seldom occur during normal driving operation, in particular in diesel engines, and must therefore often be provided by measures internal and/or external to the engine. This may take place, for example, by enrichment of exhaust gas with fuel, in particular in the form of uncombusted or partially combusted fuel, by means of fuel post-injection in the engine and subsequent exothermic oxidation of this fuel in an oxidation catalytic converter situated upstream from the particle filter and/or in the particle filter itself. The heating of the particle filter may be influenced by suitably adjusting the post-injection parameters, such as the time and quantity of the post-injection. Numerous variation options are described, for example, in PCT Publication WO 2005/003537 A1.

Exemplary embodiments of the invention are directed to an operating method for an internal combustion engine that effectively assists in particle filter regeneration, even under unfavorable operating conditions. Moreover, exemplary embodiments of the invention are directed to an internal combustion engine in which particle filter regeneration is made possible in the widest possible operating range, in particular even under partial load or low load.

In the method according to the invention, for assisting a regeneration of a particle filter situated in an exhaust gas tract of the internal combustion engine and downstream from an oxidation catalytic converter, post-injections of fuel by means of an injector take place in at least one cylinder of the internal combustion engine. According to the invention, it is additionally provided to advance a closing time of an exhaust valve of a cylinder of the internal combustion engine. The advance of the closing time is carried out in a first temperature range for a temperature of the oxidation catalytic converter, and the post-injections take place in a second temperature range for the temperature of the oxidation catalytic converter, an upper range limit of the first temperature range having a lower value than an upper range limit of the second temperature range.

The invention is based on the finding that, for carrying out intermittently performed particle filter regeneration by thermal soot burn-off, as well as for carrying out continuously performed particle filter regeneration by soot oxidation by means of $NO_2$, in particular at low loads of the internal combustion engine it may be necessary to raise the exhaust gas temperature to a correspondingly required level. However, fuel post-injection has been found to be disadvantageous in two respects. First, oxidation of fuel introduced into the exhaust gas by post-injection cannot take place when the temperature of the oxidation catalytic converter is below its light-off temperature, i.e., the oxidation catalytic converter is not yet able to oxidize the fuel, which is present in the form of uncombusted or partially combusted fuel, to an appreciable extent. Second, it has been shown that uncombusted or partially combusted fuel portions in the exhaust gas may inhibit the ability of the oxidation catalytic converter to oxidize NO to $NO_2$, in particular at comparatively low temperatures. These disadvantages may be avoided by carrying out advancement of the exhaust valve closing time, which increases the temperature, in an essentially lower temperature range that is the same as for the post-injection. Starting from low temperatures, heating of the exhaust gas initially takes place by advancing the exhaust valve control times. After the oxidation catalytic converter has reached a suitable temperature level, further heating takes place by oxidation of fuel that is introduced into the exhaust gas via the post-injection.

The post-injection preferably takes place in a range of approximately 60° crank angle to approximately 170° crank angle, particularly preferably in a range of 90° crank angle to 150° crank angle after top dead center, in the power stroke in at least one cylinder. At best, this results in a negligible influence of the post-injection on the torque provided by the internal combustion engine. Essentially uncombusted, possibly cracked, fuel is then discharged from the cylinder in question. This fuel is composed predominantly of short- to medium-chain hydrocarbons, carbon monoxide, and hydrogen. When post-injection takes place, at least one such post-injection is usually carried out after each torque-effective main injection.

Up to five individual post-injections per power stroke of the internal combustion engine operating according to the four-stroke process may take place in a time window having a duration of approximately 20 ms. In particular, one or more injections may be performed over a period of 0.2 ms to 3 ms in the power stroke. This period of 0.2 ms to 3 ms, for example, thus represents the speed-dependent time window per power stroke or working cycle of a particular cylinder operated with post-injection.

The second temperature range, i.e., the temperature range in which the post-injections are provided, preferably extends approximately from a lower range limit up to the upper range limit in the range of the light-off temperature of the oxidation catalytic converter, which may be regarded as the optimal temperature for formation of the CRT effect, and which is approximately 450° C. for the oxidation catalytic converter. The light-off temperature of a catalytic converter is usually understood to mean the temperature above which a noticeable quantity, typically approximately 50%, of the exhaust gas constituents to be treated is converted. A typical value of the light-off temperature is approximately 230° C. to 250° C.

At higher temperatures in the vicinity of the upper range limit of the second temperature range, the downstream particle filter is also advantageously heated by heat transfer. However, heating of the oxidation catalytic converter due to the exhaust gas enrichment with fuel by means of post-injection within the engine, resulting in an exhaust gas temperature downstream from the oxidation catalytic converter of greater than 330° C., and thus, a particle filter temperature of likewise greater than 330° C., may be quite adequate. The upper range limit of the second temperature range is typically not above 480° C. for the oxidation catalytic converter or for exhaust gas temperatures present on the outlet side of the oxidation catalytic converter, in order to minimize the complexity to the greatest extent possible.

Particularly effective oxidation of nitrogen oxide (NO) contained in the exhaust gas to nitrogen dioxide ($NO_2$), and particularly effective soot oxidation by the $NO_2$ that is generated, are made possible due to the setting of the temperature of the oxidation catalytic converter brought about by the post-injection. This in turn allows use of an oxidation catalytic converter having reduced loading of the noble metals platinum and/or palladium. In addition, particle filter regeneration by thermal soot burn-off may be largely avoided. The thermal load on the oxidation catalytic converter and disadvantageous aging effects are thus minimized. Therefore, little or no noble metal has to be kept on hand for compensating for an aging-related drop in activity.

Therefore, in the present case an oxidation catalytic converter is preferably used whose noble metal content, based on a volume of the oxidation catalytic converter, is in the range of 170 $g/m^3$ to 700 $g/m^3$, in particular approximately 350 $g/m^3$. Noble metal loadings of catalytic converters are also expressed in $g/ft^3$; with these units, the above-mentioned quantities correspond to values of 5 $g/ft^3$ to 20 $g/ft^3$, preferably 10 $g/ft^3$. Such noble metal loadings are relatively low compared to typical values, which are in the range of approximately 40 $g/ft^3$ to 70 $g/ft^3$. The noble metals may comprise platinum and/or palladium. Even with such a low noble metal loading of the oxidation catalytic converter compared to customary values, significant activity for oxidation from NO to $NO_2$ may be achieved in the present case. By use of an oxidation catalytic converter having the above-described comparatively low noble metal content, a significant soot conversion rate, based on the CRT reaction, may already be achieved at a temperature above approximately 230° C.

With regard to the advancing of a closing time of an exhaust valve of a cylinder, this causes the exhaust valve to close before an exhaust stroke of the particular cylinder has ended, resulting in intermediate compression of the exhaust gas in the cylinder. During this intermediate compression, compression work is performed that results in an increase in the temperature of the exhaust gas. The oxidation catalytic converter may thus be heated and in particular brought to its light-off temperature in a particularly easy manner. It is particularly preferred to advance the closing time of at least one exhaust valve in all cylinders of the internal combustion engine.

Advancing the exhaust valve closing time may take place by means of a so-called phase shifter, i.e., a variable camshaft adjustment. The phase shifter thus ensures that the exhaust valve of the corresponding cylinder of the internal combustion engine closes earlier, and in customary designs of the phase shifter, thus also opens earlier.

Advancing the exhaust valve closing time represents a very effective method for exhaust gas heating, even when a post-injection is ineffective in this regard because the oxidation catalytic converter is still below its light-off temperature. The first temperature range, in which the advancement takes place, therefore preferably extends from very low temperatures of approximately 0° C. or even lower, to an upper range limit in the range of the light-off temperature of the oxidation catalytic converter.

In one embodiment of the invention, the lower range limit of the second temperature range is selected in such a way that it at least approximately corresponds to the light-off temperature of the oxidation catalytic converter. Thus, enrichment of the exhaust gas with fuel as a result of the post-injection does not occur until the oxidation catalytic converter has been brought to its light-off temperature. It is thus ensured that the oxidation catalytic converter is able to largely react the fuel introduced into the exhaust gas, and thus be brought to a temperature that is suitable for providing $NO_2$. In particular, it may be provided that exhaust gas enrichment or fuel post-injection is not activated until a certain threshold value or trigger value of the temperature of the oxidation catalytic converter of approximately 230° C., for example, as the lower range limit for the second temperature range, has been reached. It is generally preferred for fuel enrichment of the exhaust gas to take place in a temperature range of the oxidation catalytic converter of 250° C. to 450° C. This ensures that, although the oxidation catalytic converter has reached its light-off temperature, the temperature remains in a range in which thermal damage to the oxidation catalytic converter may be largely avoided.

In another embodiment of the invention, the upper range limit of the first temperature range falls within the second temperature range, or at least approximately coincides with the lower range limit of the second temperature range.

In the first case, a gradual transition occurs between the operation of the internal combustion engine with advanced control time of the exhaust valve and the operation in which post-injection is carried out. Thus, for example, in the range of the light-off temperature of the oxidation catalytic converter, a post-injection quantity of fuel introduced into a particular cylinder of the internal combustion engine is increased with increasing temperature, while at the same time, an advance of the closing time of the exhaust valve or the exhaust valves is decreased, in particular in comparison to the operation of the oxidation catalytic converter strictly in heating mode. Thus, at the beginning, when the exhaust valve is still opening comparatively early, it is possible for only a small quantity of fuel to be introduced into the second cylinder via the post-injection. The farther the exhaust valve is advanced toward an early closing or opening time, the larger the quantity of fuel that can then be introduced into the cylinder in each post-injection. Wetting of the cylinder wall with post-injected fuel is thus largely avoided.

Undesirable wetting of the cylinder wall may result when, for early closing of the exhaust valve, the exhaust valve is also opened comparatively early. In this case, the pressure in the combustion chamber drops during the power stroke of the particular cylinder. If a post-injection takes place at this point in time, there is a risk of wetting the cylinder wall with fuel. This is due to the fact that, with reduced pressure in the combustion chamber, the fuel jet has a particularly large range during the post-injection. Wetting of the cylinder wall may in turn result in undesirable dilution of the engine lubricating oil. To prevent this, it may be provided that when post-injections are carried out, the control times of the exhaust valve are not advanced, and conversely, the closing or opening time of the exhaust valve is advanced only when post-injection is (still) not being carried out. Thus, post-injections are not begun until the control times of the exhaust valve once again correspond to those of normal operation without intermediate compression. In this case, the upper range limit of the first temperature range coincides with the lower range limit of the second temperature range.

In another embodiment of the invention, within the first temperature range, essentially a reduction in the advance of the closing time of the exhaust valve takes place with increasing temperature of the oxidation catalytic converter. Preferably the advance is progressively reduced with increasing temperature, in particular to quickly reset it to zero in the range of the light-off temperature or just before reaching same, and thus to produce the normal operating state. Further heating of the oxidation catalytic converter then occurs by oxidation of post-injected fuel.

In another embodiment of the invention, the post-injections in at least one of the cylinders of the internal combustion engine take place in a clocked manner, such that first time periods of a predefinable duration, in which post-injections are carried out in each working cycle of a particular cylinder, alternate in direct succession with second time periods of predefinable duration, in which the post-injections are prevented.

Depending on the heating requirement, a fairly large number of alternating first time periods that follow one another in direct succession are provided with exhaust gas enrichment or fuel post-injection in at least one cylinder, and second time periods are provided without exhaust gas enrichment or fuel post-injection. Due to this pulsed fuel enrichment of the exhaust gas, and carrying out a post-injection only intermittently in at least one cylinder, it is possible to achieve particularly high $NO_2$ formation at the oxidation catalytic converter and a particularly high oxidation rate by $NO_2$ and $H_2O$ for soot deposited in the particle filter. The CRT effect is thus particularly strong. This is because, among other things, during fuel enrichment of the exhaust gas, i.e., during the first time period, the oxidation catalytic converter is brought to a temperature that allows the highest possible activity of same with regard to oxidation of NO contained in the exhaust gas to $NO_2$, which may then also take place in the second time period unhindered and without inhibition of the oxidation catalytic converter by the CO and/or HC. The pulsed exhaust gas enrichment with fuel by post-injection within the engine, in which phases or first time periods with exhaust gas enrichment alternate with phases or second time periods without exhaust gas enrichment, thus results in effective passive soot oxidation of the particle filter, i.e., effective passive regeneration of the particle filter.

In the first time periods with exhaust gas enrichment or fuel post-injection, the oxidation catalytic converter, the exhaust gas, and the particle filter downstream from the oxidation catalytic converter are heated due to the exothermic oxidation of uncombusted and/or partially combusted fuel in the oxidation catalytic converter. In phases without exhaust gas enrichment or post-injection, $NO_2$ formation and soot oxidation occur due to the CRT effect. In the process, the oxidation catalytic converter and the particle filter cool down only slightly on account of their heat capacity. The temperature to be provided for regenerating the particle filter may thus be significantly lowered in comparison to an active regeneration with thermal soot burn-off by oxidation with oxygen. This is accompanied by a reduction in the thermal load on the oxidation catalytic converter and the particle filter, which in particular may be a coated, i.e., catalytically active, particle filter.

Due to the low temperature load, aging of catalytic converters installed in the exhaust gas system, such as the oxidation catalytic converter and the particle filter, and optionally a selective catalytic reduction (SCR) catalytic converter or an ammonia slip catalytic converter, is reduced. This allows a significant reduction in the noble metal loading of the oxidation catalytic converter and/or of the particle filter. The SCR catalytic converter and/or the ammonia slip catalytic converter, which oxidizes ammonia possibly escaping from the SCR, may have correspondingly small dimensions. In addition, particularly inexpensive materials may be used for the SCR catalytic converter.

In the second time period, in which the exhaust gas is typically free of uncombusted fuel and comparatively rich in oxygen, the catalyst surface of the oxidation catalytic converter is cleaned of absorbed, inhibitive fuel molecules. As a result, the availability and the catalytically active surface of the oxidation catalytic converter are increased.

Thus, as a whole, all engine components or components of the exhaust gas system are cleaned by being intermittently acted on by exhaust gas enriched with fuel. Due to the cleaning and decontamination of the oxidation catalytic converter, a lowering of the light-off temperature of the oxidation catalytic converter is also achieved. In addition, the temporal separation of the heating, i.e., the enrichment of exhaust gas or the post-injection of fuel during the first time period, from the passive regeneration during the second time period results in a particularly good passive soot burn-off rate.

In another particularly advantageous embodiment of the invention the duration of the first time period and/or the duration of the second time period is/are predefined as a function of the temperature of the oxidation catalytic converter. The temperature may be measured downstream from the oxidation catalytic converter.

When the oxidation catalytic converter is comparatively cold, fuel may be introduced into at least one cylinder over a longer first time period than for when the oxidation catalytic converter is still comparatively hot. The first time period itself, i.e., the time period in which exhaust gas enrichment or post-injection is carried out anyway, is preferably in a range of 1 s to 300 s, in particular 3 s to 30 s. The duration of the second time period, during which the enrichment with fuel or post-injection of fuel in a second cylinder is prevented, may be in the range of 0.5 s to 200 s, in particular in a range of 10 s to 60 s. This second time period or post-injection pause is variable, and its duration in principle is also independent of the duration of the first time period. Thus, a shortening or lengthening of the first time period is not necessarily accompanied by a shortening or lengthening of the second time period. With the durations of the time periods described above, it is possible to achieve particularly extensive passive regeneration of the particle filter by means of the CRT effect.

When the oxidation catalytic converter is comparatively cold, and is heated only slightly above its light-off temperature, it is also advantageous to provide no, or only a very brief, post-injection pause, whereas when the oxidation catalytic converter is already comparatively hot, a correspondingly long post-injection pause may be provided. In particular, it is possible to provide no, or at best only a very brief, post-injection pause in a temperature window of 300° C. to 350° C. of the temperature of the oxidation catalytic converter or downstream therefrom.

Furthermore, a duration during which individual fuel post-injections are carried out in the at least one cylinder for each power stroke may be set as a function of the temperature. Such a short duration for each power stroke is particularly advantageous when the temperature is already high. Thus, namely the high temperature is easily maintained, and yet wetting of the wall of the at least one second cylinder with fuel is in particular largely prevented. In contrast, to achieve a comparatively large increase in the temperature of the oxidation catalytic converter, a longer overall duration of the post-injections for each power stroke may be provided, over which at least one post-injection is carried out in the at least one cylinder. This results in large injection quantities, which lead to a correspondingly rapid increase in the temperature.

In another embodiment of the invention, a divided recirculation of exhaust gas of the cylinders of the internal combustion engine into a feed air tract of the internal combustion engine is provided in such a way that exhaust gas only from a first portion of the cylinders is suppliable in an appreciable quantity to the feed air tract of the internal combustion engine, and exhaust gas from the remaining second portion of the cylinders is supplied essentially completely to the oxidation catalytic converter, with no recirculation, wherein post-injections of fuel take place only in at least one of the cylinders of the second portion of the cylinders. In other words, exhaust gas is enriched only for one or more cylinders whose exhaust gas is not recirculated. Stated another way, in general there is no fuel enrichment of exhaust gas by means of post-injection for one or more cylinders whose exhaust gas is recirculated.

This is based on the finding that fuel enrichment of the exhaust gas with uncombusted and/or partially combusted fuel may result in undesirable so-called sooting of the feed air tract when this exhaust gas is recirculated. This is avoided in the present case, since enrichment of exhaust gas is carried out only for the cylinder/cylinders whose exhaust gas is not able, or at best is able only to a negligible extent, to pass into an exhaust gas recirculation line via which exhaust gas is recirculatable into the feed air tract of the internal combustion engine. Functionally reliable operation of the internal combustion engine may be ensured in a particularly simple manner due to the avoidance of uncombusted fuel acting on the feed air tract, and in particular on a charge air cooler situated in the feed air tract or intake air path.

In another advantageous embodiment of the invention, for carrying out the post-injections, a control current of the injector is adjusted for actuating a valve needle of the injector as a function of a temperature of the oxidation catalytic converter. Changing the control current allows particularly accurate setting of low post-injection quantities, thus improving setting of the temperature of the particle filter. The method according to the invention is particularly suited for assisting with continuous particle filter regeneration via soot oxidation using $NO_2$, corresponding to the CRT effect.

The injector may be an electromagnetic injector or piezo injector. In the preferred case of an electromagnetic injector, the control current flow through a solenoid, causing the valve needle of the injector to lift up and thus enabling a valve opening for the post-injection of fuel. The duration and height of the needle lift, together with a fuel injection pressure in conjunction with the flow coefficient of the injector, determine the quantity of fuel injected in each post-injection, and thus, the quantity of chemical energy introduced into the exhaust gas that is available for heating after conversion into thermal energy by exothermic oxidation at the oxidation catalytic converter or in the particle filter.

In another embodiment of the invention, above a predefinable temperature of the oxidation catalytic converter, a post-injection quantity is limited in that, during the post-injections, a needle lift amplitude of the valve needle of the injector is set that is less than a maximum needle lift amplitude. In this case the valve needle is not completely brought into its final position in the opened state of the injector, thus allowing small post-injection quantities to be accurately set. For this purpose, a reduced control current is set to a value below a control current nominal value. In this case, the magnetic force generated for the opening motion of the valve needle is less than with control with the nominal current, and the injector opens somewhat more slowly and with a delay. The valve needle typically drops back immediately after reaching the reduced lift amplitude for depositing the post-injection. The duration of a post-injection within a power stroke is thus comparatively short. This is particularly advantageous when the temperature is already high. Thus, the high temperature is easily maintained, and at the same time, due to the short duration, wetting of the wall of the at least one cylinder, operated with post-injection, with post-injected fuel is largely prevented.

In another advantageous variant, a similar behavior results when a duration of control of the injector with the control current is decreased for setting the reduced needle lift amplitude. Below a lower limit control duration, for an injector that is controlled with the nominal value of the control current or also with a lower control current, the valve needle no longer reaches the maximum possible lift, but instead reaches a reduced lift, and after reaching this reduced lift amplitude position quickly drops back to the closed state.

The internal combustion engine according to the invention has an exhaust gas tract in which an oxidation catalytic converter and a particle filter, situated downstream from the oxidation catalytic converter in terms of flow, are situated, and is designed for carrying out a method corresponding to at least one of the variants described above. In particular, appropriate control means such as an electronic control unit and corresponding actuators and sensors are provided for carrying out the control functions.

The features and feature combinations mentioned above in the description as well as the features and feature combinations mentioned below in the description of the figures and/or only shown in the figures may be used not only in the particular stated combination, but also in other combinations or alone without departing from the scope of the invention.

BRIEF DESCRIPTION OF THE DRAWING FIGURES

Further advantages, features, and particulars of the invention result from the claims, the following description of preferred embodiments, and with reference to the drawings, which show the following:

DETAILED DESCRIPTION

Figure 1:
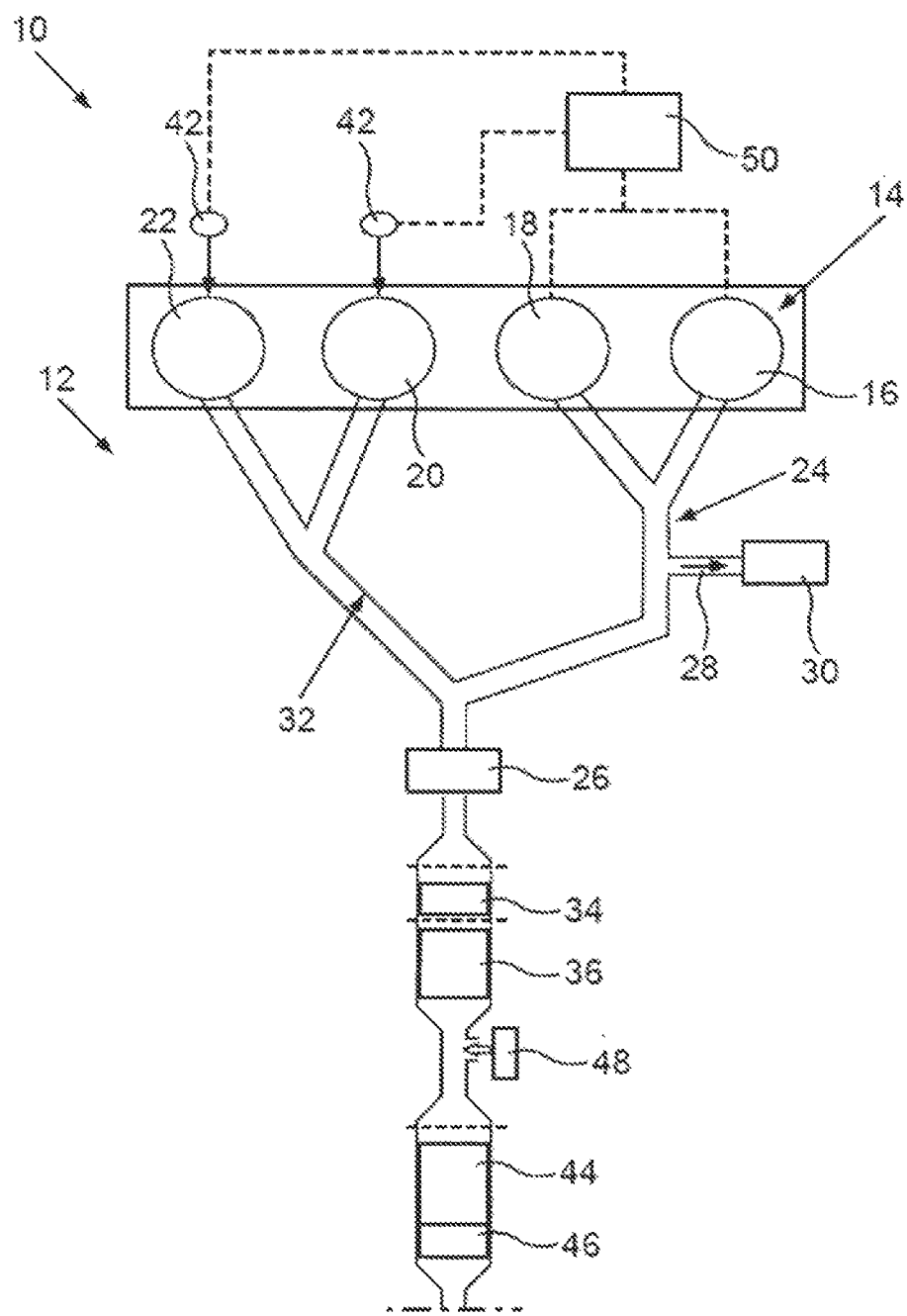
FIG. 1 shows an arrangement of an exhaust gas system in an internal combustion engine of a vehicle, fuel being post-injected into only two cylinders of the internal combustion engine, from which no exhaust gas is recirculated.

FIG. 1 shows an arrangement 10 of an exhaust gas system 12 in an internal combustion engine 14, designed as a direct-injection 4-stroke diesel engine, of a vehicle, in particular a utility vehicle. The diesel engine 14 has four cylinders 16, 18, 20, 22 in the present case. A group of two (in the present case) first cylinders 16, 18 is fluidically coupled to a turbine 26 of an exhaust gas turbocharger via an exhaust gas line 24. An exhaust gas recirculation line 28 branches off from the exhaust gas line 24 into which the exhaust gas of the two first cylinders 16, 18 passes. The exhaust gas recirculation line 28 is designed as a high-pressure exhaust gas recirculation line in the present case; however, in addition a low-pressure exhaust gas recirculation may be provided. The quantity of exhaust gas recirculated into a feed air tract (not shown) of the internal combustion engine 14 may be set via an exhaust gas recirculation valve 30, which is shown only schematically.

The other two, second cylinders 20, 22 of the internal combustion engine 14 are fluidically coupled to the turbine 26 via a further exhaust gas line 32. However, no exhaust gas recirculation line branches off from this second exhaust gas line 32. Therefore, exhaust gas discharged from the second cylinders 20, 22 is not able, or at best is able only to a negligible extent, to pass into the exhaust gas recirculation line 28 and to the inlet side of the internal combustion engine 14. The exhaust gas lines 24 and 32 may be integral parts of an exhaust manifold having a two-part design.

The exhaust gas system 12 includes an oxidation catalytic converter 34, in particular a diesel oxidation catalytic converter, situated downstream from the turbine 26, downstream from which a particle filter 36, in particular a diesel particle filter, is situated. The particle filter 36 may in particular be a particle filter coated with oxidation catalyst. Downstream from the particle filter 36, an SCR catalytic converter 44 may be provided in the exhaust gas system 12, downstream from which an (optional) catalytic converter for oxidizing ammonia, i.e., a so-called ammonia slip catalytic converter 46, may be situated. If an SCR catalytic converter 44 is provided, upstream from same a metering device 48 meters a reducing agent solution for selective reduction of nitrogen oxides, preferably an aqueous urea solution, from which ammonia is formed in the hot exhaust gas. The ammonia is then reacted in the selective catalytic reduction (SCR) catalytic converter 44 in a selective catalytic reduction reaction with nitrogen oxides contained in the exhaust gas to produce nitrogen and water.

For operation of the diesel engine 14, fuel is injected into the cylinders 16, 18, 20, 22 via injectors (not illustrated), for which purpose the injectors are appropriately controlled with a control current by a control unit 50. Without limiting the universality, it is assumed below that the injectors are those having an electromagnetically actuated valve needle. A plurality of individual fuel injections may be carried out in each working cycle. In the present case, an increase in the temperature of the oxidation catalytic converter 34 is achieved by means of fuel post-injection within the engine, so that the oxidation catalytic converter may oxidize NO present in the exhaust gas to $NO_2$ in a particularly efficient manner. A fuel post-injection may include multiple, in particular up to five, individual post-injection operations within a power stroke of a cylinder operated with post-injection. The discussion below refers to one post-injection for simplicity. Soot particles that have accumulated on the particle filter 36 may be oxidized by the $NO_2$ formed at the oxidation catalytic converter 34, and by $H_2O$. This passive regeneration of the particle filter 36 with soot oxidation using $NO_2$ preferably proceeds in a temperature range above approximately 300° C., i.e., in a temperature range in which thermal aging of the oxidation catalytic converter 34 is limited to a comparatively small extent. A temperature of approximately 450° C. is ideal and particularly preferred.

If the temperature of the oxidation catalytic converter 34 is below the light-off temperature, post-injection for the heating is not practical, and preferably is not provided or is provided only to a very limited extent. In such a case, heating of the oxidation catalytic converter 34 preferably takes place by shifting the control times of at least one exhaust valve in at least one of the cylinders 16, 18, 20, 22 of the diesel engine 14. In the present case a phase shifter is preferably used for this purpose. Due to such a variable camshaft control, an opening time 82 and a closing time 84 of an exhaust valve (see FIG. 2), in particular of the particular second cylinder 20, 22, are advanced. An advance of up to approximately 60° crank angle may be provided.

Figure 2:
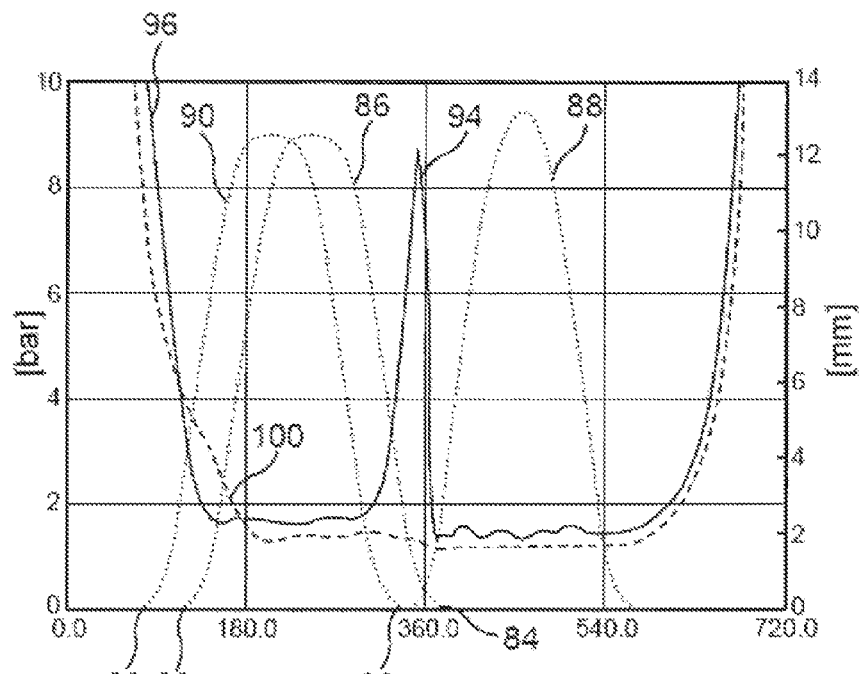
FIG. 2 shows the shifting of an opening time and a closing time of an exhaust valve of one of the cylinders of the internal combustion engine, and the change in pressure in the combustion chamber which accompanies this shift.

This is illustrated in FIG. 2, in which a curve 86 shows the lift of an exhaust valve during normal operation of the diesel engine 14. The exhaust valve correspondingly closes when an intake valve opens, the lift of which is depicted by a further curve 88. Due to the phase shifter, the opening time 82 and the closing time 84 of the exhaust valve are now advanced, as depicted by a further curve 90 in FIG. 2.

Correspondingly, a closing time 92 of the exhaust valve is reached before the exhaust stroke of the particular cylinder has ended. This results in an intermediate compression in the combustion chamber of the cylinder, which is depicted in FIG. 2 as the maximum 94 or peak of a further curve 96 which indicates the pressure in the combustion chamber.

The same as for the closing time 92, an opening time 98 of the exhaust valve is also advanced. This causes the combustion chamber pressure to drop, specifically in the present case, in the range of approximately 140° crank angle. For illustrating this drop in pressure in the combustion chamber, in FIG. 2 a further curve 100 indicates the pressure conditions in the combustion chamber during normal control of the exhaust valve, corresponding to the curve 86.

Due to the temperature increase accompanying the intermediate compression and which is caused by the residual gas still being compressed when the exhaust valve now closes earlier, the oxidation catalytic converter 34 may be brought to its light-off temperature in a particularly simple and uncomplicated way. The phase shifter preferably acts on all cylinders 16, 18, 20, 22 of the diesel engine 14 in the same way.

However, if a post-injection is carried out in the combustion chamber when the pressure is reduced in the combustion chamber due to the early opening of the exhaust valve, the fuel jet is thus able to spray against the cylinder wall with a higher pulse and a larger mass fraction due to the lower back-pressure in the cylinder. This results in undesirable entry of fuel into the engine oil.

Therefore, in the present case with active post-injection, there is preferably little or no advancement of the opening time 82 and of the closing time 84 of the exhaust valve when post-injections take place. Conversely, post-injections are carried out anyway, in particular with a larger quantity of fuel 42, only when the advanced opening time 98 and the advanced closing time 92 have been shifted back toward the normal position.

In particular in the range of the light-off temperature of the oxidation catalytic converter 34, an overlap may be provided in such a way that an increasing quantity of fuel 42 is injected by means of the post-injection, while the advanced times are increasingly shifted back toward the normal opening time 82 and the normal closing time 84. The wetting of the cylinder wall with fuel 42 introduced during a post-injection is thus limited to a minimum.

Figure 3:
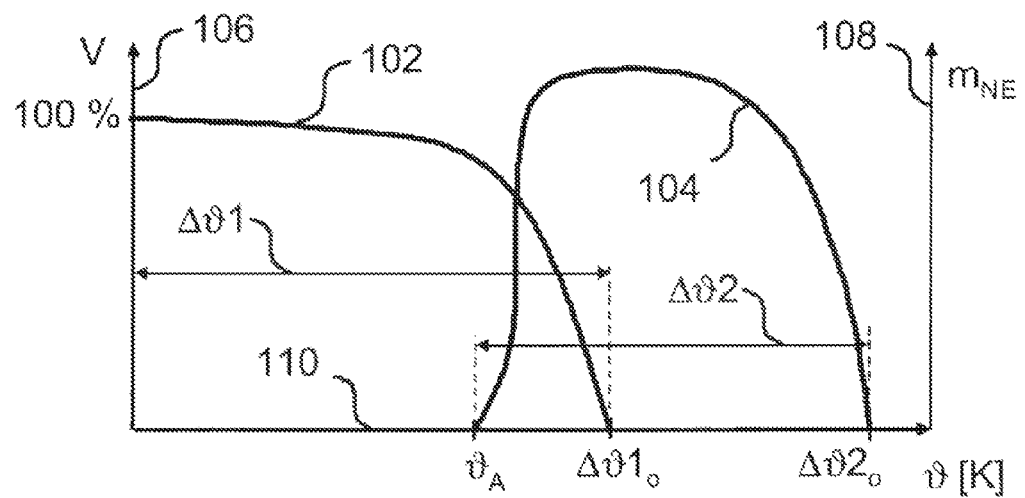
FIG. 3 shows a graph illustrating the procedure for advancing exhaust valve control times in conjunction with a setting of post-injection quantities.

An example of a procedure is schematically illustrated in FIG. 3. In the graph in FIG. 3, a curve 102 is associated with an advance V, plotted on a left ordinate 106, of the opening and closing time 82, 92, respectively, of a particular exhaust valve. An advance V is provided in a first temperature range, denoted by $\Delta\theta 1$, of the oxidation catalytic converter 34.

Starting from low temperatures $\theta$ below the light-off temperature, denoted by $\theta_A$, of the oxidation catalytic converter 34, the advance V of 100%, corresponding approximately to a 60° crank angle, is reduced to the normal operation setting with an increasing temperature $\theta$ plotted on an abscissa 110. In particular, the advance is increasingly reduced in the range of the light-off temperature $\theta_A$. When an upper range limit $\Delta\theta 1_o$ of the first temperature range $\Delta\theta 1$ is reached, the advance V of the control times is completely discontinued, and the normal operation of the diesel engine 14 with regard to the control times of the exhaust valves is achieved. Thus, no advance V of the control times is provided above the upper range limit $\Delta\theta 1_o$ of the first temperature range $\Delta\theta 1$. The upper range limit $\Delta\theta 1_o$ of the first temperature range $\Delta\theta 1$ preferably approximately corresponds to the light-off temperature $\theta_A$ of the oxidation catalytic converter 34, but, as illustrated in FIG. 3, may also be slightly above same. It may thus be ensured that the oxidation catalytic converter 34 is reliably heated to the light-off temperature $\theta_A$ or above same via the advance V of the exhaust valve control times. However, it is preferred that the upper range limit $\Delta\theta 1_o$ of the first temperature range $\Delta\theta 1$ is not more than approximately 20 K above the light-off temperature $\theta_A$.

Upon reaching the light-off temperature $\theta_A$, the oxidation catalytic converter 34 is able to react uncombusted or partially combusted fuel constituents, for which reason further heating may be brought about in at least one of the second cylinders 20, 22 by means of the above-described post-injection of fuel. A total post-injection quantity $m_{NE}$ for each power stroke, illustrated in FIG. 3 as the curve 104 and plotted on the ordinate 108, is therefore set in such a way that it initially rises increasingly quickly within a second temperature range $\Delta\theta 2$ with increasing temperature $\Delta\theta$ As the heating requirement decreases and the temperature $\theta$ of the oxidation catalytic converter 34 increasingly approaches the target temperature of approximately 450° C., the total post-injection quantity $m_{NE}$ once again decreases. Thus, post-injections take place only in the second temperature range $\Delta\theta 2$. The lower range limit of the second temperature range $\Delta\theta 2$ at least approximately corresponds to the light-off temperature $\theta_A$ of the oxidation catalytic converter 34. The predefinable upper range limit $\Delta\theta 2_o$ of the second temperature range $\Delta\theta 2$ corresponds to the mentioned target temperature at which an at least approximately optimal CRT effect may be achieved. By combining the advance V of the exhaust valve control times and the post-injection, heating of the oxidation catalytic converter 34, and thus $NO_2$ formation, may therefore be achieved in an effective, fuel-conserving manner which allows effective soot oxidation in the particle filter 36, and therefore largely avoids thermal particle filter regeneration by oxygen-induced soot burn-off.

Figure 4:
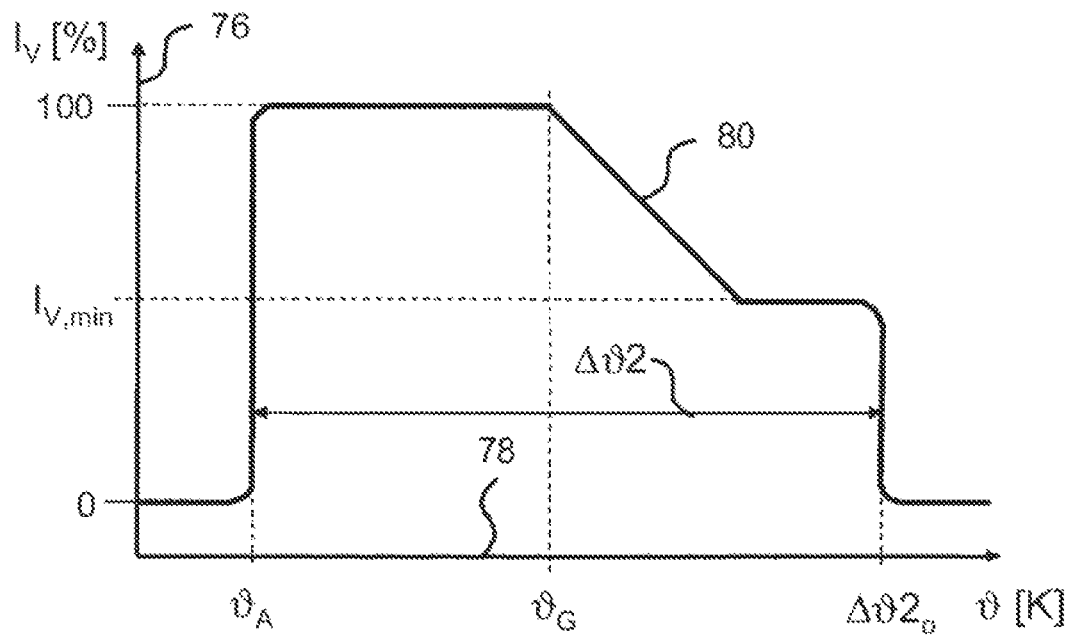
FIG. 4 shows a graph illustrating an advantageous curve of the dependency of a control duration of an injector of the internal combustion engine on the temperature of an oxidation catalytic converter associated with the internal combustion engine.

It is provided that for the fuel post-injections within the engine in a cylinder operated in each case with post-injection, the control current of the particular injector is set as a function of the temperature $\theta$ of the oxidation catalytic converter 34. This situation is illustrated by way of example by a diagram illustrated in FIG. 4. In this diagram, a curve 80 depicts the curve of the control current $I_V$, plotted on the ordinate 76, as a function of the temperature $\theta$ of the oxidation catalytic converter 34 plotted on the abscissa 78. In the present case, upon reaching the light-off temperature $\theta_A$ of the oxidation catalytic converter 34 with regard to oxidation of hydrocarbons, a respective injector is controlled with the nominal value of the control current $I_V$. To heat up the oxidation catalytic converter 34 as quickly as possible, initially a comparatively large post-injection quantity is preferably deposited, and a control duration of the injector likewise has a corresponding length, so that the valve needle of the injector is fully open during a post-injection operation.

With increasing temperature $\theta$ of the oxidation catalytic converter 34, the heating requirement becomes increasingly less, and therefore the post-injection quantity decreases. After reaching a predefinable limit temperature $\theta_G$ of approximately 380° C. to 420° C., in the present case the post-injection quantity is decreased by increasingly reducing the control current $I_V$ with further increasing temperature $\theta$. This initially results in the valve needle opening less quickly and in a somewhat delayed manner, for which reason a reduced quantity of fuel is injected for the same control duration. Depending on the control duration, upon further reduction of the control current $I_V$ the valve needle no longer reaches its maximum possible lift amplitude. Particularly accurate setting of low post-injection quantities is made possible in this way. The oxidation catalytic converter 34 may therefore be held at an elevated temperature in a particularly effective manner, or heated to a sought target temperature without risk of excessive heating. It is provided to reduce the control current $I_V$ to no farther than a minimum value $I_{V,min}$ in order to ensure opening of the valve needle even with a reduced control current $I_V$. With further increasing temperature θ of the oxidation catalytic converter 34, after reaching the upper range limit $\Delta\theta 2_o$ of approximately 450° C. to preferably 480° C. maximum of the second temperature range $\Delta\theta 2$, in which post-injections are provided anyway, no further heating is necessary, and the post-injections are ended. To avoid an undesirable influence on the torque-active main injection and on a pre-injection, which may possibly be provided, when the control current $I_V$ is reduced, it is preferably provided to adjust the time and duration of these fuel injections in compensation.

However, the enrichment of the exhaust gas with uncombusted or partially combusted fuel, brought about by a post-injection, may result in undesirable inhibition or passivation of the oxidation catalytic converter 34 with regard to its $NO_2$ formation activity. To nevertheless oxidize NO contained in the exhaust gas to $NO_2$ to the greatest extent possible, it is preferably provided to continually interrupt the post-injection. The inhibition is thus eliminated, and the oxidation catalytic converter 34 is once again able to oxidize NO to $NO_2$ at an increased rate. To ensure a heating function at the same time, the diesel engine 14 is operated intermittently in alternation with and without post-injection. In other words, in this operating mode, first time periods are provided in which a post-injection takes place, these first time periods alternating in direct succession with second time periods in which a post-injection is prevented. This procedure is explained in greater detail below with reference to FIG. 5.

Figure 5:
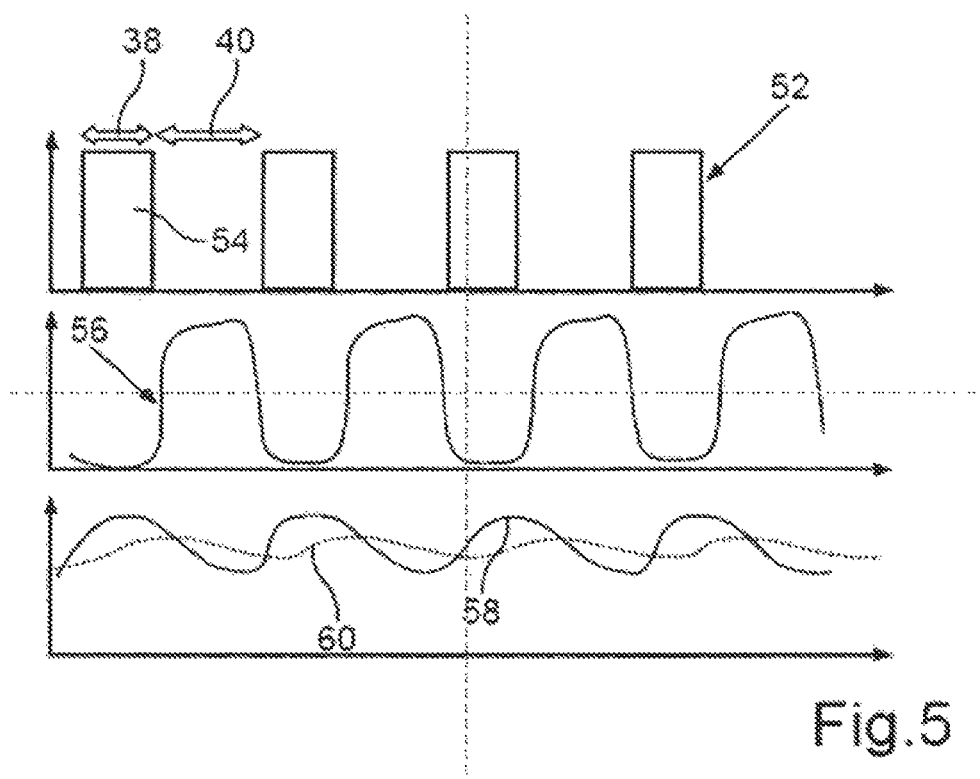
FIG. 5 shows curves illustrating the pulsed post-injection of fuel, the associated heating of an oxidation catalytic converter of the exhaust gas system, and the changes in the $NO_2$ content in the exhaust gas which accompany the pulsed post-injection.

FIG. 5 illustrates a detail of a plurality of alternating time periods that follow one another in direct succession, in which a post-injection is carried out and prevented. In a first phase or time period 38, post-injections are carried out in the diesel engine 14 in order to increase the temperature of the oxidation catalytic converter 34. In a subsequent second phase or second time period 40, no post-injection takes place; i.e., the carrying out of post-injections is prevented. Thus, the post-injections take place in a pulsed or clocked manner in the present case, so that the first time period 38 with post-injections alternates with the second time period 40 without post-injections.

In the present case, however, a post-injection of fuel 42 is carried out only in the second cylinders 20, 22 (see FIG. 1), whose exhaust gas is not recirculated; these cylinders are thus connected to the second exhaust gas line 32. In contrast, no post-injection takes place in the two first cylinders 16, 18 of the diesel engine 14; therefore, these cylinders are not acted on by post-injected fuel 42 during the first time period 38.

The post-injection of the fuel 42 thus takes place solely in the two second cylinders 20, 22, and not in the two first cylinders 16, 18, whose exhaust gas is or may be recirculated into the feed air tract to a greater or lesser extent. Action by post-injected, and thus uncombusted, fuel on the exhaust gas recirculation line 28, on an exhaust gas recirculation cooler (not shown), and on the feed air tract, and therefore so-called sooting, are thus avoided.

The post-injection preferably takes place in the range of 60° crank angle to 170° crank angle after top dead center in the power stroke of the two second cylinders 20, 22. A range of 90° crank angle to 150° crank angle after top dead center is particularly preferred. Depending on the individual post-injection and depending on the temperature of the oxidation catalytic converter 34, a quantity of 0 mg to 60 mg of fuel 42 per cylinder 20, 22 and per liter of displacement of the respective cylinder 20, 22 may be freely set.

The control unit 50 preferably ensures that no fuel is post-injected into the (in the present case) two first cylinders 16, 18 during the first time period 38, while only exhaust gas of the two second cylinders 20, 22 is enriched with uncombusted hydrocarbons via the post-injection.

In FIG. 5, in a first curve 52, bars 54 depict the quantity of fuel 42 introduced into the two second cylinders 20, 22 via the post-injection within the engine during the first time period 38.

A second curve 56 in FIG. 5 depicts the ratio of $NO_2$ to $NO_x$ downstream from the oxidation catalytic converter 34 due to this intermittent or pulsed operation, i.e., the action by the post-injected fuel 42 on the two second cylinders 20, 22, and the subsequent second time period 40 during which primarily the passive regeneration of the particle filter 36 takes place. Consequently, in the heating phase, i.e., during the first time period 38, there is practically no $NO_2$ in the exhaust gas. However, a large quantity of $NO_2$ is formed when no more fuel is post-injected into the second cylinders 20, 22 of the diesel engine 14 during the second time period 40. Thus, during the second time period 40, i.e., in the regeneration mode, a comparatively large quantity of $NO_2$ is available in the exhaust gas.

A further curve 58 depicts the temperature of the exhaust gas downstream from the oxidation catalytic converter 34. This curve fluctuates according to the action by fuel on the exhaust gas in the heating mode, and is thus higher during the first time period 38 than in the subsequent regeneration phase or second time period 40. However, these fluctuations in the temperature are damped due to the comparatively high heat capacity of the oxidation catalytic converter 34. The fluctuation in the temperature on the outlet side of the particle filter 36, which occurs in a time-delayed delayed manner, is even more strongly damped, as depicted by a further curve 60 in FIG. 5.

Figure 6:
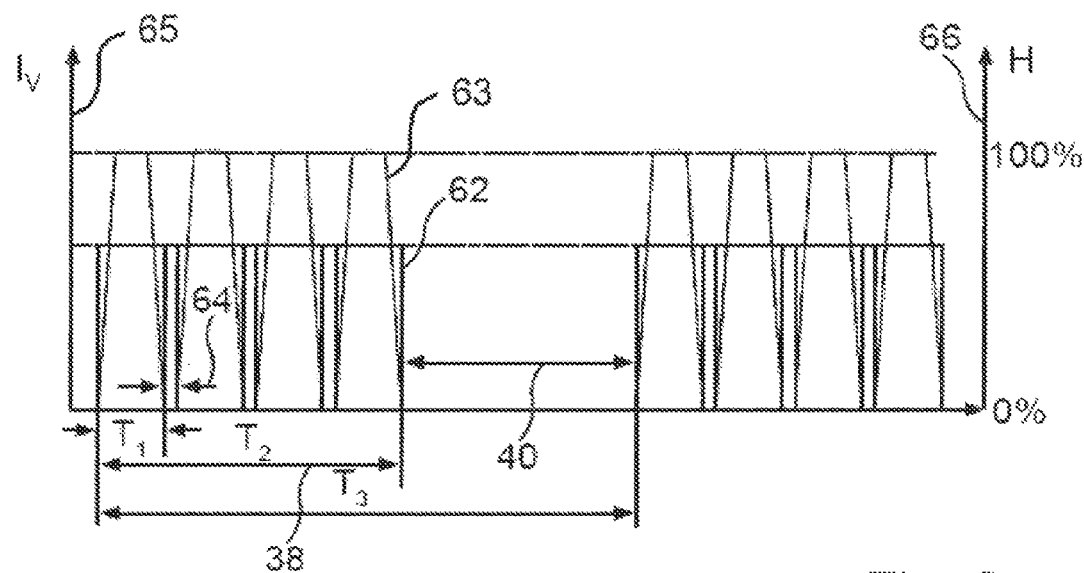
FIG. 6 shows a graph illustrating the variation over time of a control current and a needle opening when carrying out post-injections.

FIG. 6 shows a detailed view of how a particular injector is controlled during the first time period 38 in order to inject the fuel 42 into the two second cylinders 20, 22 in an individual post-injection operation. $T_1$ denotes the control duration of the injector for carrying out an individual post-injection operation for each power stroke of the second cylinder 20, 22; the control duration $T_1$ may in particular be 0.2 ms to 20 ms. However, multiple, typically up to four, individual post-injections may also be carried out during this period.

In FIG. 6, $T_2$ corresponds to the first time period 38, i.e., a period of time during which fuel 42 is post-injected into a particular second cylinder 20, 22 during each power stroke. This period of time is in a range of 1 s to 300 s. A post-injection pause corresponds to the second time period 40, and according to FIG. 6 results from the difference $T_3-T_2$, where $T_3$ is the time period from the beginning of a first post-injection to the end of the post-injection pause.

A curve 62 in FIG. 6 indicates the control current $I_V$ that causes the injector to open, and causes the valve needle of the injector to lift up and thus enables a valve opening for the post-injection of fuel. A value of the control current $I_V$ is indicated on a left ordinate 65 of the graph in FIG. 6. During the control duration $T_1$ of an individual post-injection operation, the control current $I_V$ is applied to the injector of a particular second cylinder 20, 22. FIG. 6 depicts a further time period 64 indicating the time between two power strokes of the second cylinder 20, 22, i.e., the time between two control durations $T_1$. This time period 64 is correspondingly short at a high speed of the diesel engine 14.

In the mode of operation according to FIG. 6, the particular injector is acted on with a comparatively large control current $I_V$, and for a comparatively long control duration $T_1$. Correspondingly, a needle opening or a valve needle lift H of 100%, corresponding to the maximum needle lift amplitude, is reached over a comparatively long time period, as depicted by a curve 63; a value of the needle opening H is indicated on an ordinate 66 of the graph in FIG. 6. Such a setting is advantageous for a sought rapid heating of the oxidation catalytic converter 34. In particular, at a comparatively high load of greater than approximately 60% of the nominal load of the diesel engine 14, and/or under highly variable load, at the same time with a relatively long post-injection pause of more than approximately twice the first time period $T_2$, a fuel-conserving temperature setting of the oxidation catalytic converter 34 is made possible for achieving a high $NO_2$ fraction in the exhaust gas.

A post-injection quantity adapted to a particular heating requirement for the oxidation catalytic converter 34 may advantageously be achieved not only by changing or reducing the control current $I_V$, but also by changing the control duration $T_1$. In a mode of operation of the diesel engine 14 depicted in the graph according to FIG. 7, the control duration $T_1$ of the control current $I_V$ is shortened and the time period 64 is correspondingly longer. A needle opening H of 100% is achieved, but only for a short time. Thus, a smaller quantity of fuel 42 is post-injected into the two second cylinders 20, 22. Such a mode of operation is particularly advantageous when only a comparatively small temperature rise of the oxidation catalytic converter 34 is sought, for example when the oxidation catalytic converter 34 already has a comparatively high temperature θ of approximately 400° C. or above. If the engine speed is comparatively low, for example lower than 1500/min, the time period 64 is correspondingly lengthened, and only a comparatively small number of post-injections can be carried out per unit time. In such a case, it is advantageous to shorten the injection pause $T_3-T_2$ and to correspondingly lengthen the first time period $T_2$, for example to a greater value than the post-injection pause.

Figure 7:
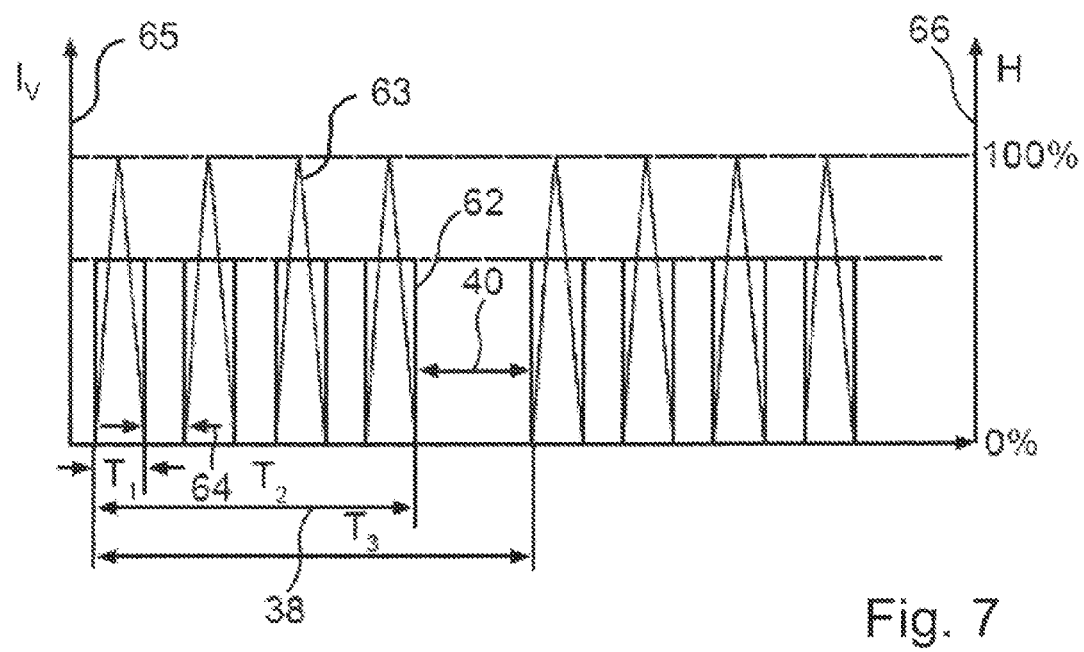
FIG. 7 shows another graph in which the full control current is applied over a shorter time period than in the graph according to FIG. 6.
Figure 8:
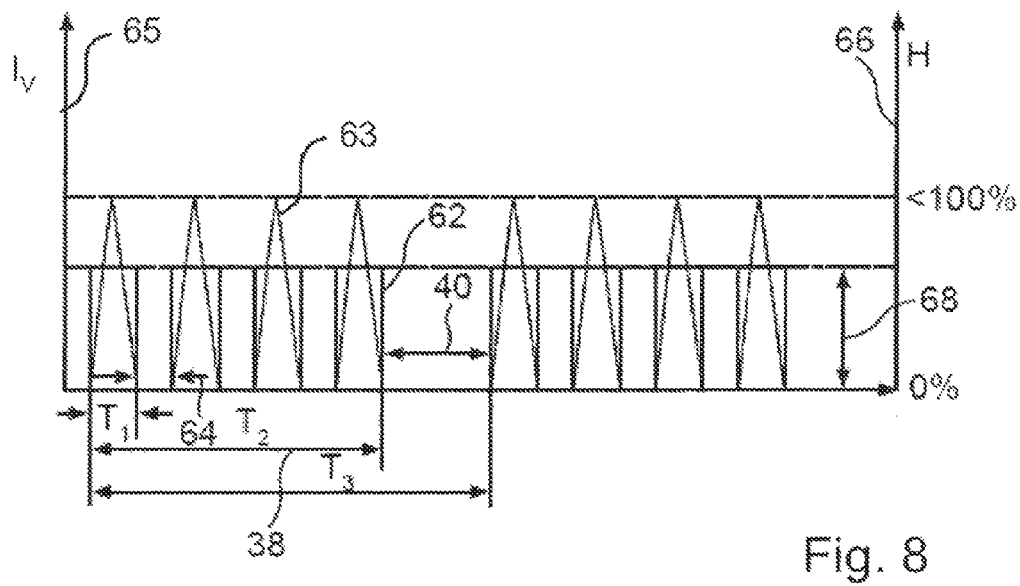
FIG. 8 shows a graph according to FIG. 7 in which, however, an amplitude of the control current is additionally reduced compared to the graph according to FIG. 7.

When the control current $I_V$ is additionally reduced with a shortened control duration $T_1$ according to FIG. 7, the post-injection quantity may be adjusted even more finely, in particular even further reduced. In such a case, depicted in FIG. 8, the needle lift H no longer reaches the value of the maximum possible needle lift amplitude, but, rather, only reaches a more or less reduced needle lift amplitude corresponding to the reduced height or amplitude 68 of the control current $I_V$. Correspondingly, even a smaller needle opening H than the needle opening H of 100% is achieved only for a very short period.

Figure 9:
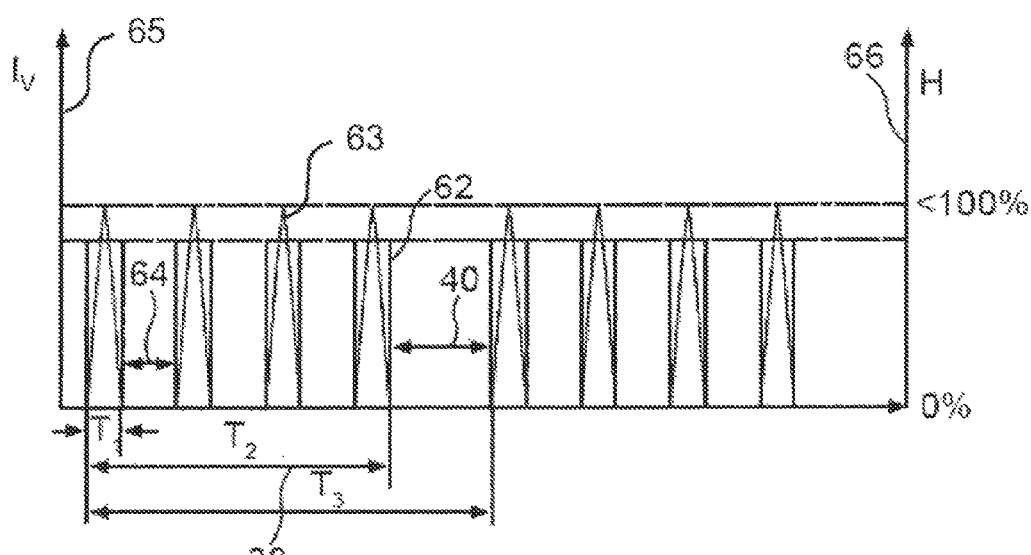
FIG. 9 shows a graph according to FIG. 7, but with a further reduced duration over which the control current is applied.

In the mode of operation of the internal combustion engine 14 according to FIG. 9, the reduced needle lift H of less than 100% is achieved by the nominal control current $I_V$ acting on the injector, analogously to FIG. 7, but with a further decreased control duration $T_1$.

Thus, a needle lift amplitude of the valve needle of the injector that is less than a maximum needle lift amplitude may be set by reducing the control current $I_V$ and by reducing the control duration $T_1$, thus limiting the post-injection quantity. Incomplete opening of the valve needle is attributed to its ballistic properties, and the corresponding state may also be referred to as a ballistic needle lift.

A quantity of post-injected fuel 42 that is reduced in this way is provided in particular when the oxidation catalytic converter 34 has reached a comparatively high temperature. Then, even though the temperature of the oxidation catalytic converter 34 is in particular largely maintained, undesirable wetting of the walls of the second cylinders 20, 22 with the post-injected fuel 42 does not occur.

Full variability of the control duration $T_1$ and of the amplitude 68 of the control current $I_V$ is provided within the first time period 38, as the result of which the post-injection quantity may be adapted to a heating requirement for the oxidation catalytic converter 34 or the particle filter 36, and at the same time a strongly pronounced CRT effect may be achieved, flexibly and virtually independently of the engine operating state, but still taking it into account.

Figure 10:
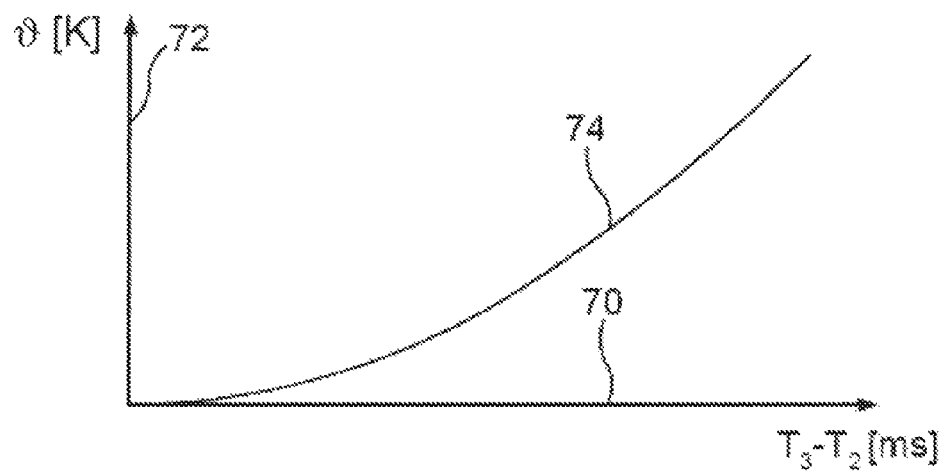
FIG. 10 shows the increase in the post-injection pause between time periods during which post-injections are carried out, as a function of the temperature of the oxidation catalytic converter.

One example of such is depicted in a diagram shown in FIG. 10, in which a duration of the post-injection pause, which is preferably set as a function of the temperature θ of the oxidation catalytic converter 34, is illustrated by way of example. The duration of the post-injection pause $T_3-T_2$ is indicated on the abscissa 70, and the temperature θ on the outlet side of the oxidation catalytic converter 34 is indicated on the ordinate 72. An increasingly lengthening post-injection pause or time period 40 with increasing temperature θ of the oxidation catalytic converter 34 is preferably set, and in particular in a temperature range close to a target temperature of approximately 450° C., corresponding to the curve 74 shown in the diagram. For a less strongly heated oxidation catalytic converter 34, no, or only a very brief, post-injection pause is set, depending on the heating requirement, while for a comparatively hot oxidation catalytic converter 34 a longer second time period 40 is present.

Figure 11:
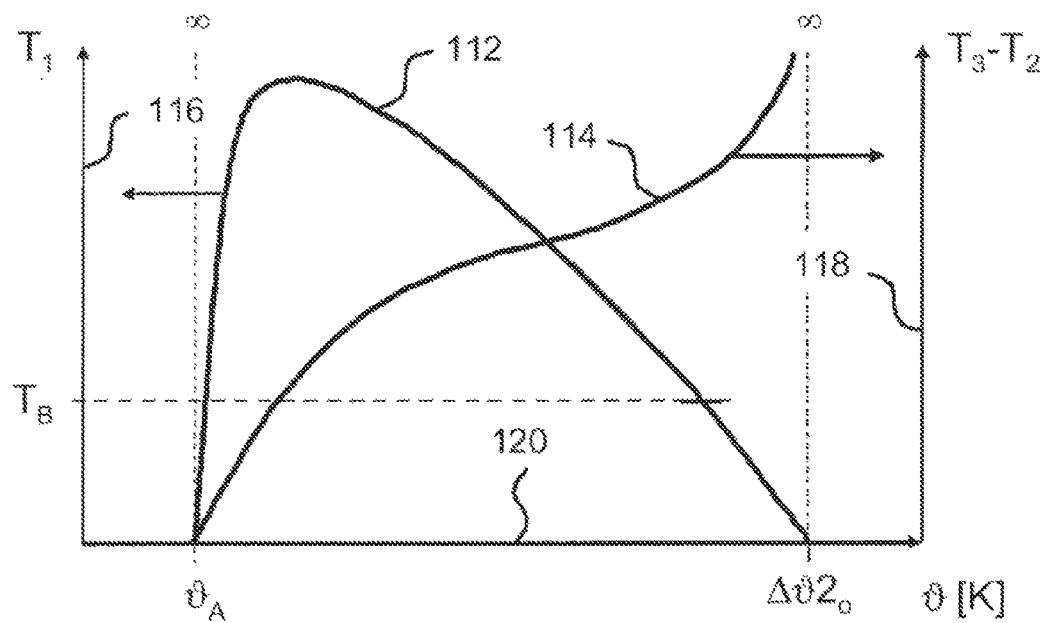
FIG. 11 shows a diagram illustrating an advantageous dependency of the injector control duration and of the post-injection pause on the temperature of the oxidation catalytic converter.

Another example of a preferred procedure for setting the pulsed post-injection is depicted in a diagram shown in FIG. 11, in which the setting of the control duration $T_1$ (curve 112) and of the post-injection pause $T_3-T_2$ (curve 114) as a function of the temperature θ of the oxidation catalytic converter 34, plotted on the abscissa 120, are illustrated. The control duration $T_1$ is associated with a left ordinate 116, and the post-injection pause $T_3-T_2$ is associated with a right ordinate 118. Analogously to the curve 74 in FIG. 10, a duration of the injection pause that increases with increasing temperature θ of the oxidation catalytic converter 34 is set. At the same time, upon exceedance of the light-off temperature $θ_A$ of the oxidation catalytic converter 34 a control duration $T_1$ that initially rises quickly is set. A comparatively large post-injection quantity is thus achieved which allows rapid heating of the oxidation catalytic converter 34. With increasing temperature θ of the oxidation catalytic converter 34, the heating requirement decreases and the control duration $T_1$ is reduced until, upon reaching the predefinable upper range limit $Δθ2_o$ of approximately 450° C. of the second temperature range $Δθ2$, the post-injection operation is ended. Below a control duration $T_B$, the above-described ballistic behavior of the valve needle develops, with a lift amplitude that is less than the maximum lift amplitude.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Arrangement
12 Exhaust gas system
14 Internal combustion engine
16 Cylinder
18 Cylinder 20 Cylinder
22 Cylinder
24 Exhaust gas line
26 Turbine
28 Exhaust gas recirculation line
30 Exhaust gas recirculation valve
32 Exhaust gas line
34 Oxidation catalytic converter
36 Particle filter
38 Time period
40 Time period
42 Fuel
44 SCR catalytic converter
46 Ammonia slip catalytic converter
48 Metering device
50 Control unit
52 Curve
54 Bar
56 Curve
58 Curve
60 Curve
62 Curve
63 Curve
64 Time period
65 Ordinate
66 Ordinate
68 Amplitude
70 Abscissa
72 Ordinate
74 Curve
76 Ordinate
78 Abscissa
80 Curve
82 Opening time
84 Closing time
86 Curve
88 Curve
90 Curve
92 Closing time
94 Maximum
96 Curve
98 Opening time
100 Curve
102 Curve
104 Curve
106 Ordinate
108 Ordinate
110 Abscissa
112 Curve
114 Curve
116 Ordinate
118 Ordinate
120 Abscissa

The invention claimed is:

1. A method for operating an internal combustion engine, the method comprising:
post-injecting fuel, by an injector in at least one cylinder of the internal combustion engine, to assist in regeneration of a particle filter situated in an exhaust gas tract of the internal combustion engine and downstream from an oxidation catalytic converter;
controlling an advance of a closing time of an exhaust valve of a cylinder of the internal combustion engine in such a way that intermediate compression of exhaust gas in the combustion chamber of the cylinder occurs, wherein the advance of the closing time is performed in a first temperature range for a temperature of the oxidation catalytic converter, and the post-injections occur in a second temperature range for the temperature of the oxidation catalytic converter, wherein an upper range limit of the first temperature range has a lower value than an upper range limit of the second temperature range;
and wherein within the first temperature range, the advance of the closing time of the exhaust valve is reduced as the temperature of the oxidation catalytic converter increases.

2. The method of claim 1, wherein advancing of an opening time of the exhaust valve is carried out in parallel with the advance of the closing time of the exhaust valve.

3. The method of claim 2, wherein the upper range limit of the first temperature range falls within the second temperature range, or the upper range limit of the first temperature range coincides with the lower range limit of the second temperature range.

4. The method of claim 1, wherein a lower range limit of the second temperature range at least corresponds to a light-off temperature of the oxidation catalytic converter.

5. The method of claim 4, wherein the upper range limit of the first temperature range falls within the second temperature range, or the upper range limit of the first temperature range coincides with the lower range limit of the second temperature range.

6. The method of claim 1, wherein the upper range limit of the first temperature range falls within the second temperature range, or at least coincides with the lower range limit of the second temperature range.

7. The method of claim 1, wherein in the range of the light-off temperature of the oxidation catalytic converter, the advance of the closing time is increasingly reduced with increasing temperature of the oxidation catalytic converter.

8. The method of claim 1, wherein the post-injections in at least one of the cylinders of the internal combustion engine occurs in a clocked manner, such that first time periods of a predefinable duration, in which post-injections are carried out in each working cycle of a particular cylinder, alternate in direct succession with second time periods of predefinable duration, in which the post-injections are inhibited.

9. The method of claim 8, wherein the duration of the first time period or the duration of the second time period is predefined as a function of the temperature of the oxidation catalytic converter.

10. The method of claim 9, wherein a divided recirculation of exhaust gas of the cylinders of the internal combustion engine into a feed air tract of the internal combustion engine is provided in such a way that exhaust gas only from a first portion of the cylinders is suppliable in an appreciable quantity to the feed air tract of the internal combustion engine, and exhaust gas from the remaining second portion of the cylinders is supplied completely to the oxidation catalytic converter, with no recirculation, wherein post-injections of fuel take place only in at least one of the cylinders of the second portion of the cylinders.

11. The method of claim 8, wherein a divided recirculation of exhaust gas of the cylinders of the internal combustion engine into a feed air tract of the internal combustion engine is provided in such a way that exhaust gas only from a first portion of the cylinders is suppliable in an appreciable quantity to the feed air tract of the internal combustion engine, and exhaust gas from the remaining second portion of the cylinders is supplied completely to the oxidation catalytic converter, with no recirculation, wherein post-injections of fuel take place only in at least one of the cylinders of the second portion of the cylinders.

12. The method of claim 1, wherein performing the post-injections involves adjusting a control current of the injector for actuating a valve needle of the injector as a function of a temperature of the oxidation catalytic converter.

13. The method of claim 12, wherein above a predefinable temperature of the oxidation catalytic converter, a post-injection quantity is limited in that, during the post-injections, a needle lift amplitude of the valve needle of the injector is set which is less than a maximum needle lift amplitude.

14. An internal combustion engine, comprising:
a first group of cylinders;
a second group of cylinders,
wherein the first group of cylinders are fluidically coupled to a turbine of an exhaust gas turbocharger via a first exhaust gas line, and the second group of cylinders are fluidically coupled to the turbine of the exhaust gas turbocharger via a second exhaust gas line,
wherein an exhaust gas recirculation line for recirculating exhaust gas of the internal combustion engine into a feed air tract of the internal combustion engine branches off only from the first exhaust gas line,
wherein downstream from the turbine, an oxidation catalytic converter and a particle filter, downstream from the oxidation catalytic converter in terms of flow, are situated in an exhaust gas tract of the internal combustion engine, and
injectors associated with respective cylinders of the internal combustion engine, exhaust valves associated with respective cylinders of the internal combustion engine, and an electronic control unit operably connected to the injectors and the exhaust valves, wherein the electronic control unit is configured to:
control an injector associated in each case with one cylinder to perform a plurality of fuel injections within a working cycle, control an exhaust valve associated with one cylinder of the internal combustion engine with regard to an opening time and a closing time in such a way that an advance of a closing time of the exhaust valve is carried out in a first temperature range for a temperature of the oxidation catalytic converter, and control at least one injector for carrying out a post-injection of fuel in a second temperature range for the temperature of the oxidation catalytic converter, wherein an upper range limit of the first temperature range has a lower value than an upper range limit of the second temperature range,
and wherein within the first temperature range, the advance of the closing time of the exhaust valve is reduced as the temperature of the oxidation catalytic converter increases.

15. The internal combustion engine of claim 14, wherein the electronic control unit controls an injector of at least one of the cylinders in a clocked manner in such a way that first time periods of a predefinable duration, in which post-injections are carried out in each working cycle of the at least one cylinder, alternate in direct succession with second time periods of predefinable duration, in which the post-injections are prevented.

16. The internal combustion engine of claim 14, wherein the electronic control unit controls the injectors in such a way that post-injections of fuel take place only in at least one of the cylinders of the second group of cylinders.

* * * * *